No. 713,501. Patented Nov. 11, 1902.
M. RYDER.
APPARATUS FOR EXTRACTING, TRANSPORTING, AND REPLANTING TREES.
(Application filed June 30, 1900.)
(No Model.) 5 Sheets—Sheet 1.

WITNESSES: INVENTOR
Malcolm Ryder.
BY
Fowler & Fowler,
ATTORNEYS

No. 713,501. Patented Nov. 11, 1902.
M. RYDER.
APPARATUS FOR EXTRACTING, TRANSPORTING, AND REPLANTING TREES.
(Application filed June 30, 1900.)
(No Model.) 5 Sheets—Sheet 3.

WITNESSES:

INVENTOR
Malcolm Ryder
BY
ATTORNEYS.

No. 713,501. Patented Nov. 11, 1902.
M. RYDER.
APPARATUS FOR EXTRACTING, TRANSPORTING, AND REPLANTING TREES.
(Application filed June 30, 1900.)
(No Model.) 5 Sheets—Sheet 4.

WITNESSES:

INVENTOR

BY

ATTORNEYS.

No. 713,501. Patented Nov. 11, 1902.
M. RYDER.
APPARATUS FOR EXTRACTING, TRANSPORTING, AND REPLANTING TREES.
(Application filed June 30, 1900.)
(No Model.) 5 Sheets—Sheet 5.

WITNESSES:

INVENTOR
Malcolm Ryder,
BY
ATTORNEYS.

UNITED STATES PATENT OFFICE.

MALCOLM RYDER, OF NEW YORK, N. Y., ASSIGNOR, BY MESNE ASSIGNMENTS, TO LARGE TREE TRANSPLANTING COMPANY, A CORPORATION OF NEW YORK.

APPARATUS FOR EXTRACTING, TRANSPORTING, AND REPLANTING TREES.

SPECIFICATION forming part of Letters Patent No. 713,501, dated November 11, 1902.

Application filed June 30, 1900. Serial No. 22,127. (No model.)

*To all whom it may concern:*

Be it known that I, MALCOLM RYDER, a citizen of the United States, residing at New York city, borough of Manhattan, county and State of New York, have invented certain new and useful Improvements in Apparatus for Extracting, Transporting, and Replanting Trees, of which the following is such a full, clear, and exact description as will enable any one skilled in the art to which it appertains to make and use the same, reference being had to the accompanying drawings, forming part of this specification.

My invention relates to apparatus for extracting a tree from the ground, transporting the same, and replanting it wherever desired.

The principal objects of the invention are to provide an efficient form of apparatus whereby a very large tree may be handled with quite the same ease and facility as a small tree, whereby the tree may be extracted, transported, and replanted with but very little manipulation, whereby the tree may be readily shifted on the apparatus to balance the load without liability of injuring the tree itself, and whereby in transporting the tree on the apparatus it may be fully protected against injury from any undue motion or strain on the tree.

With these and other objects in view my invention consists in the various novel and peculiar arrangements and combinations of the several parts of the apparatus, all as hereinafter fully described and then pointed out in the claims.

I have illustrated a type of my invention in the accompanying drawings, wherein—

Referring to the drawings, in which like numbers of reference designate like parts throughout, 2 represents the ground-wheels of the rear truck, which are mounted upon an axle 3, from which extends a tongue or pole 4. Upon the axle 3 are secured two suitably-spaced uprights 5, between which is secured a horizontal bolster 6, from the central point of which extends a brace 7, having its other end secured to the tongue 4 of the truck. (See particularly Figs. 1, 2, and 6.) The uprights or standards 5 are also braced to the tongue 4 by means of the stays 8.

The uprights 5 are each formed with an opening 9, which constitute guideways for the bearing-blocks 10, in which is mounted a horizontal rotary roller 11. (See particularly Figs. 1, 2, 5, and 6.) These bearing-blocks are shaped suitably to slide vertically in the guideways 9, and each is formed with an inwardly-projecting piece 12, which is enlarged, so that the block cannot move outwardly through the guide-opening, and each block is provided with a strap 13, which passes over the roller 11. The bolster 6 is recessed at 14 beneath each of the extensions 12 of the bearing-blocks 10, so that an elevated part 15 is provided between the inner ends of the two blocks, as shown particularly in Figs. 6 and 7.

The saddle 16, which has its upper surface formed concave for receiving the rounded trunk of the tree, is mounted upon the friction-roller 11 by means of the parallel guide-brackets 17, one of which is located at each side of the saddle, and they both loosely embrace the roller, so that the saddle may be readily moved longitudinally of the vehicle and tilted on the roller as a fulcrum. The saddle and its guide-brackets and the friction-roller 11 are so constructed and arranged that the under surface of the saddle is engaged by the roller in order that the rotation of the roller may serve to shift the saddle back and forth longitudinally of the truck. The roller may be turned in any suitable manner by hand, though I show the roller as being formed at each end with a perforation 18, in which a removable hand-bar may be inserted for turning the roller in either direction, a collar 19 being fixed upon the roller near each end thereof to the outside of the bearing-blocks to prevent endwise movement of the roller in its bearings.

Figures 1, 2, 3, 4:
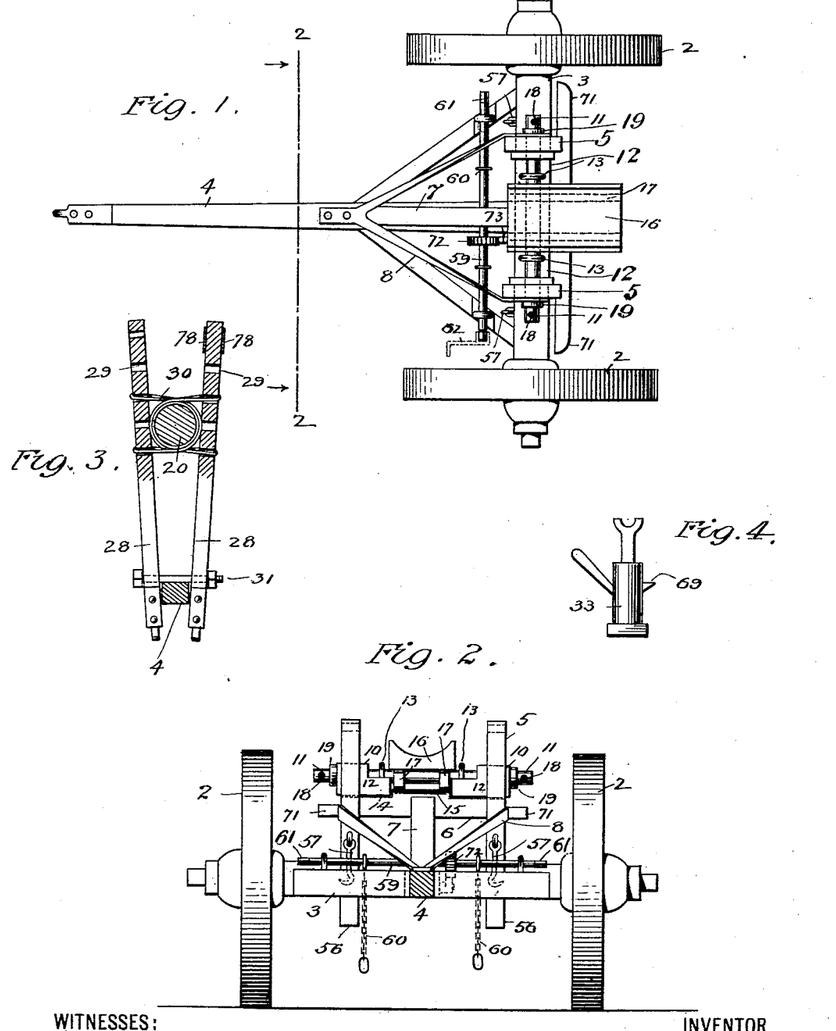
Figure 1 is a plan view of the rear or tree-supporting truck of the apparatus, the truck being shown as detached and with the saddle thereof moved to its inward limit of movement.
Fig. 2 is a sectional view of the rear truck, the section of which is taken on a plane indicated by line 2 2, Fig. 1.
Fig. 3 is a view of detached parts of the apparatus shown partly in vertical transverse section, the parts being the props or supports which are attached to the tongue of the tree-supporting truck and to which the trunk of the tree is lashed.
Fig. 4 is a side view of one of the lifting-jacks employed in the apparatus, as hereinafter described.
Figure 5:
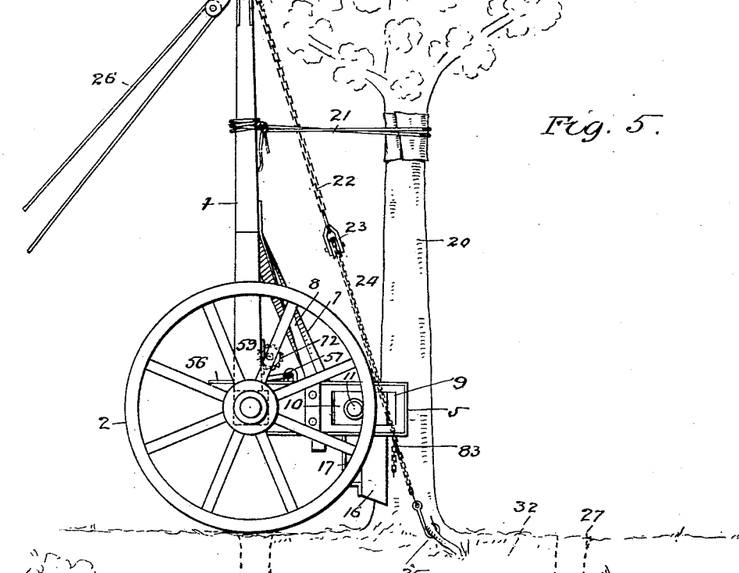
Fig. 5 is a side view of the tree-supporting truck shown with its tongue standing in vertical position and attached to the trunk of the tree which is to be extracted, the ball of the tree comprising its roots and the soil in which they are embedded being shown in dotted lines as well as the trough-like excavation made in circular form around the ball. In this view the block and tackle for extracting the tree is also shown as attached to the tongue of the truck.
Figure 6:
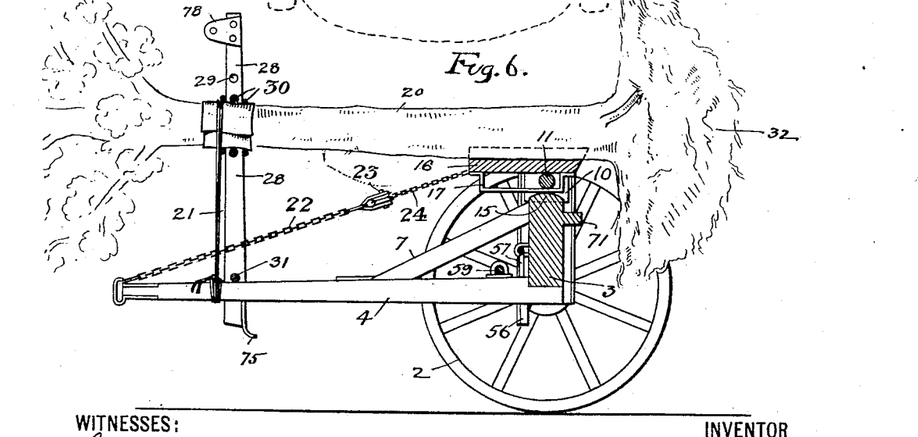
Fig. 6 is a side view of the tree-supporting truck, together with a tree mounted thereon, and shows the latter in horizontal position after it has been extracted from the ground for transportation. In this view the saddle in which the trunk of the tree rests is shown as moved to its outward limit of movement and the saddle and the bolster beneath it and its adjusting-roller being shown in vertical section.

With the apparatus hereinbefore described a tree may be extracted by shifting the saddle 16 to its inner limit of movement and standing the truck against the tree, (indicated by the numeral 20 in Fig. 5,) so that the concave surface of the saddle engages the tree near its base and the tongue of the truck stands upright and substantially parallel with the trunk of the tree, and then securing the upper part of the trunk of the tree to the outer end of the tongue of the truck by a suitable rope or chain 21, connecting the extreme outer end of the tongue 4 of the truck with the roots of the tree by a chain connection comprising a single stretch 22 of chain and a pulley 23, through which is passed a chain 24, having at each end a hook 25 for engaging the large roots of the tree upon opposite sides thereof. This pulley 23 causes the ends of the chain 24 to pull alike on the roots when the chain is made taut. Under this condition by applying a block and tackle 26 to the tongue 4 of the truck and pulling upon the same the tree may be extracted from the ground, which has been previously excavated by cutting around the tree a circular ditch, which is indicated at 27 in Fig. 5. It will be noted that by virtue of connecting the pulling-chains 22 and 24 with the extreme outer end of the tongue 4 an effective leverage is obtained in pulling the tree out of the ground. When the tree is thus extracted, it may be readily transported a short distance by rigidly securing the upper end of the trunk of the tree to the outer end of the tongue 4 of the truck by means of suitable props 28, placed one upon each side of the tongue and the tree, as shown in Figs. 3 and 6. These props are formed near one end with perforations 29, through which a suitable cord 30 may be laced and passed around the trunk of the tree to lash the same to the props, and a horizontal bolt 31 is secured between the props near their lower ends above the tongue, the bolt preventing the tree from moving inwardly toward the tongue, while the rope 21 prevents the tree from pulling outwardly away from the tongue. In thus transporting the tree upon the truck alone the saddle in which the tree is supported is shifted outwardly, so as to stand at its limit of outward movement in order to bring the ball of the tree as near the axle of the truck as possible to balance the load.

In many cases the ball of earth 32 is of such a large diameter that it is necessary to raise the saddle when the tree-supporting truck is tilted down in horizontal position for transportation; otherwise the ball would touch the ground in transporting the tree on the truck alone. The same condition also arises when the body of the wagon is attached to the tree-supporting truck for long-distance transportation, as hereinafter described. In either case the saddle 16 may be readily raised by placing under each end of the friction-roller 11 an ordinary lifting-jack 33 and operating the jacks so as to raise the saddle and the superposed tree, as more particularly shown in Fig. 13, wherein the saddle is shown as raised and supported by the jacks 33 at the highest point of adjustment of the saddle. The jacks are placed directly upon the axle 3 and may be operated from either side thereof, preferably, however, the outer side of the axle, where there is an unobstructed space, and for this purpose I prefer to use the ordinary ratchet-jack, and I moreover find these jacks useful for lifting the wheel of the truck or wagon in case the same becomes stalled.

Figure 18:
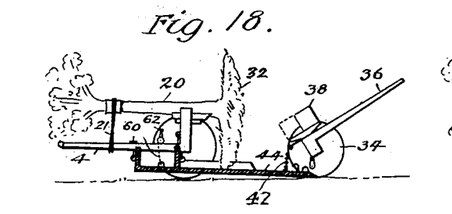
Figure 19:
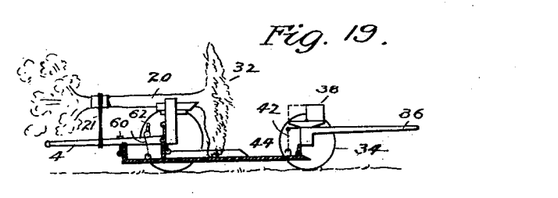

In transporting a tree any considerable distance I employ in connection with the truck just described another truck and a wagon-body, which parts together make up a four-wheeled wagon. The other truck, which is the forward truck of the wagon, comprises a pair of wheels 34, turning on an axle 35, which is provided with a tongue 36, carrying a whiffletree 37, to which the horses are hitched for pulling the wagon. This forward truck is provided with a hinged box 38, which is rectangular in cross-section and is hinged at 39 at one corner thereof to the truck above the axle, so that it may be swung into a position either forward of the axle, as shown in dotted lines in Figs. 7 and 11, or back of the axle, as shown in full lines in said figures. This box is provided with a hinged lid 40, having a fastener 41, and it serves as a tool-box as well as a seat for the driver. The purpose of having this box hinged to the truck, so that its weight may be shifted either fore or aft of the axle, is to enable the weight to be placed aft and thus taken off the tongue of the forward truck in transportation, and, again, to pitch the weight forward upon the tongue when tipping the truck by hand to pick up the forward end of the wagon-body, as hereinafter described. This forward truck is provided with a pair of supporting-chains 42, which are detachably connected with hooks 43 on the wagon-body 44, and another detachable connection is provided between the axle of the forward truck and the forward end of the wagon-body in the way of an ordinary clevis 45, which is also detachable. In loading the tree upon the wagon after the tree-carrying truck is coupled up with the rear end of the wagon-body, as will be hereinafter described, the forward end of the wagon-body, which lies upon the ground, is raised and connected with the forward truck by bringing the forward truck into the position in Fig. 18 and tipping the pole upward, at the same time shifting the tool-box 40 forward of the axle and then connecting the chains 42 with the hooks 43. The tongue of the truck is then depressed into horizontal position, as shown in Fig. 19, also in Figs. 7 and 11, after which the clevis 45 is fastened, so as to provide a strong connection between the wagon-body and the forward truck. When this is done, the tool-box is swung back into the full-line position (shown in Fig. 7 and 11) in order to throw the weight thereof off of the pole of the truck.

Figure 7:
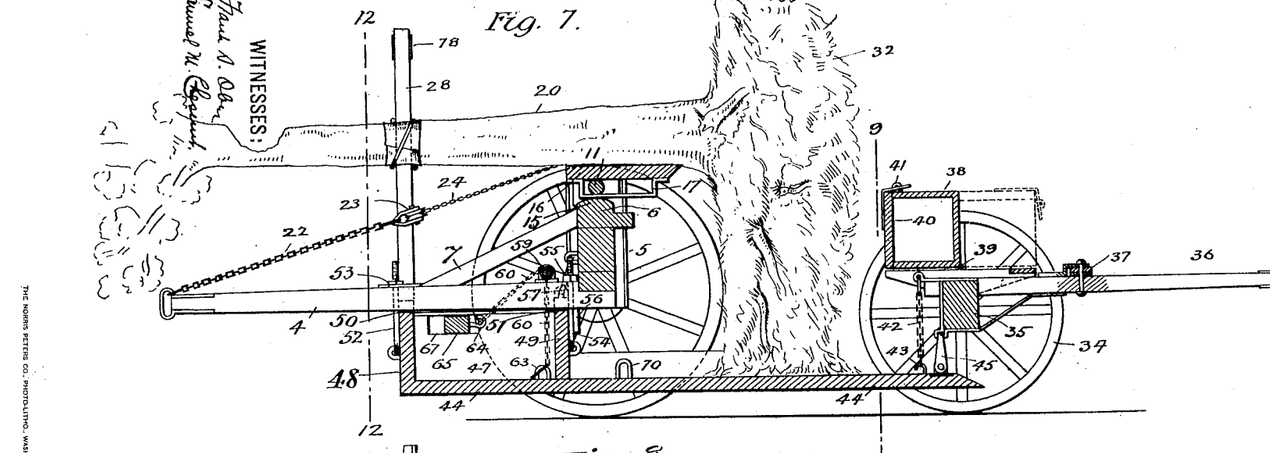
Fig. 7 is a side view, in vertical longitudinal section, of the complete wagon, comprising the tree-supporting truck, the forward truck, and the wagon-body suspended beneath the two trucks, together with a tree mounted in position for transportation.
Figure 8:
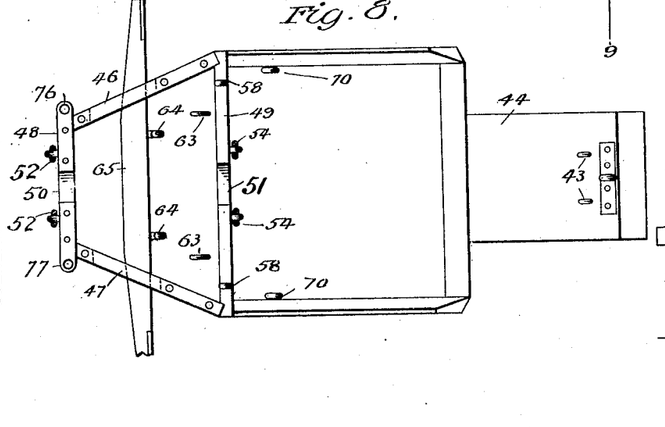
Fig. 8 is a plan view of the wagon-body shown as detached, together with the brake-beam.
Figure 9:
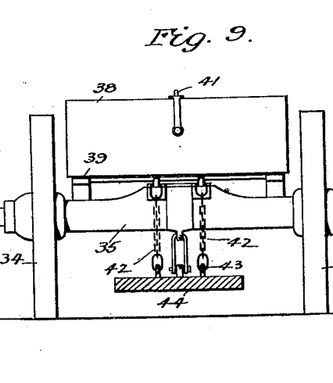
Fig. 9 is a back view of the forward truck with the wagon-body shown in vertical transverse section, taken on a plane indicated by line 9 9, Fig. 7.

The rear end of the wagon-body 44 is provided with an open-top box-like compartment formed by the upright sides 46 and 47, the end 48, and the cross-piece 49. The upper edges of the end piece 48 and the cross-piece 49 are formed with square notches 50 and 51, respectively, and into which the tongue 4 of the tree-supporting truck fits when the parts are coupled together, as shown in Fig. 7. In coupling this truck with the wagon-body the wagon-body is raised up, so that the tongue 4 fits within the notches 50 and 51, and a pair of swinging bolts 52, which are carried upon the rear end of the wagon-body, are brought up one on each side of the tongue 4, so that the clamping-nut 53 on each bolt may be turned down to come in contact with the upper side of the tongue, thereby binding the parts together. (See Figs. 7 and 12.) For this same purpose the cross-piece 49 is provided with a swinging bolt 54, carried upon each side of the notch 51, so that these bolts may be swung into upright position, and their clamping-nuts 55 may be turned down firmly in contact with the upper side of the tongue 4 of the truck, as shown in Fig. 7. In addition to this box-like structure at the rear end of the truck serving as part of the means for firmly attaching the tree-supporting truck to the wagon-body it may also be used as a place to put tools and any tackle that may be used in connection with the apparatus.

Figure 10:
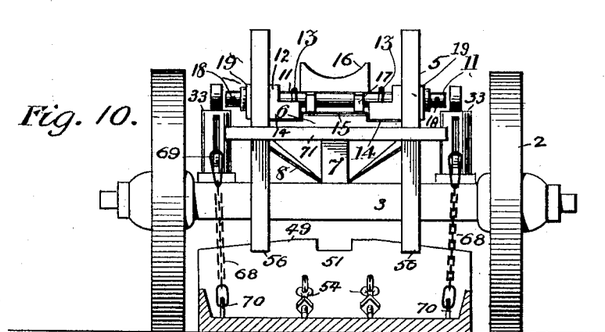
Fig. 10 is a view of the tree-supporting truck looking toward the inner end thereof, together with the wagon-body, which is shown in vertical transverse section and in its lowest position when lying upon the ground.

Upon the axle 3 of the tree-supporting truck are two depending pieces 56, which are designed to extend downwardly in such position as to be engaged by the inner face of the cross-piece 49 of the wagon-body, as shown in Figs. 7 and 10, in order that the draft on the wagon-body may be largely taken up by the rear truck through this means. Draft-hooks 57 are also provided, the same being mounted upon the rear side of the tree-supporting truck, so as to hook into eyes 58, mounted upon the cross-piece 49 of the wagon-body, as shown more particularly in Figs. 1, 2, 7, and 8.

In order to raise the rear end of the wagon-body into position to be coupled with the tree-supporting truck when the tree is mounted thereon, I provide a windlass comprising a winding-shaft 59, which is mounted in suitable bearings horizontally across the truck to the rear of the axle, and a pair of chains 60, mounted on the shaft, the outer ends of which shaft are each formed with a squared head 61 for receiving a removable crank 62 for turning the same. The ends of these chains are adapted to be detachably connected with the hooks 63, mounted on the bottom of the wagon-body, so that by connecting the winding-chains with these hooks when the wagon-body is resting on the ground and then turning the shaft 59 the wagon-body may be gradually raised into position to be coupled with the truck, and after being so coupled together the winding-chains may be detached, if desired, though when the wagon-body is to be lowered to the ground again the windlass is again brought into operation and the shaft turned so as to unwind the chains and lower the wagon-body accordingly. The winding-shaft 59 is provided with a ratchet-wheel 72, having a pawl 73 for locking the ratchet against reverse movement. This winding-shaft and its chains 60 are also used as part of a brake mechanism for braking the wheels of the tree-supporting truck in transporting the tree. In using these parts in the brake mechanism the chains are detached from the hooks 63 of the wagon-body and are connected with hooks 64 on a horizontal brake-beam 65, which extends horizontally across the wagon-body, passing through openings 67 in the sides 46 and 47, respectively, of the wagon-body. This enables the beam 65 to be drawn inwardly, so as to brake the wheels 2 of the truck by turning the shaft 59 in the direction to wind the chains.

The rear end of the wagon-body may also be raised into position to be coupled with the tree-supporting truck by means of the lifting-jacks 33. For this purpose these jacks are moved outwardly from under the ends of the friction-roller 11, as shown in Fig. 10, and a chain 68 is connected between the toe 69 on each jack and an eye 70 on the wagon-body. The jacks are then operated so as to lift the wagon-body up against the under side of the truck into position to be coupled thereto. A cross-piece 71, extending horizontally across the forward side of the uprights 5 of the truck, projects sufficiently far outwardly at each side to engage the jacks, as shown in Fig. 10, and prevent their dislodgment when raising the wagon-body.

Figures 12, 13, 14, 15, 16, 17:
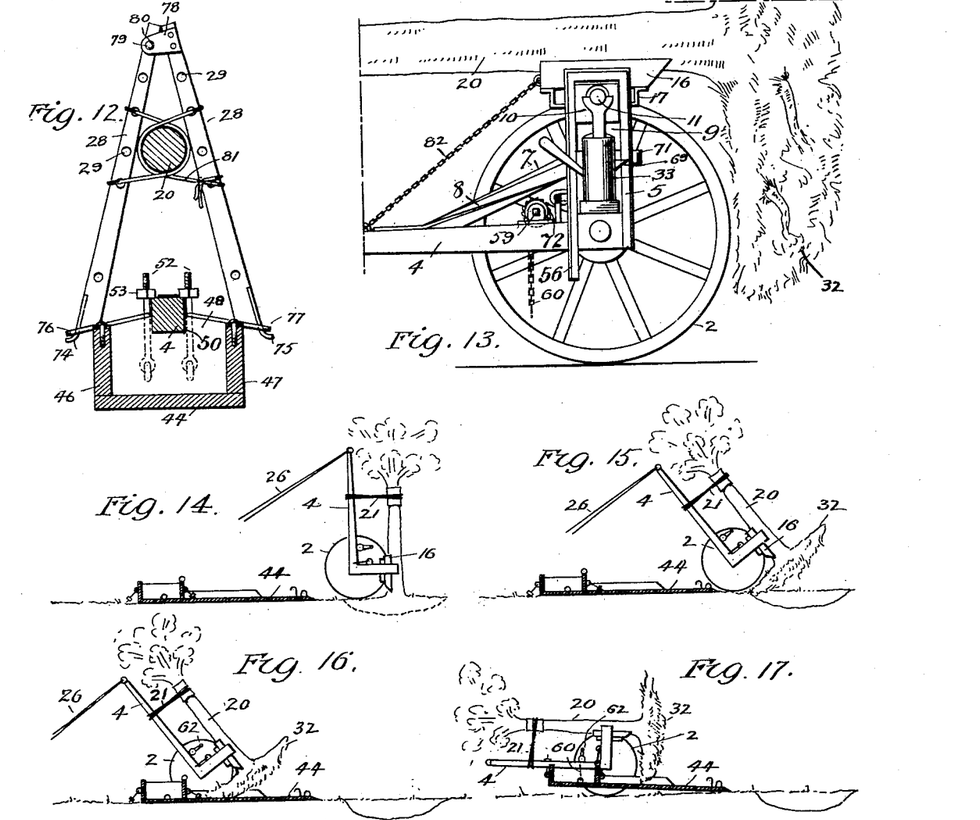
Fig. 12 is a vertical transverse section of the apparatus, the plane of which section is indicated by line 12 12, Fig. 7.
Fig. 13 is a side view of the main portion of the tree-supporting truck, together with the tree mounted thereon, in its saddle and the jacks for raising the saddle.
Figs. 14 to 19, inclusive, show side elevations of a tree and parts of the apparatus, on a reduced scale, showing the series of steps pursued in extracting the tree from the ground and loading it upon the truck and then the wagon for transportation, as hereinafter described.

In transporting the tree upon the wagon the trunk of the tree, which projects rearwardly from the wagon, is supported at its upper part by means of a suitable truss-like frame comprising two pieces 28, having at their lower ends suitable hooks 74 and 75, respectively, for taking into the eyes 76 and and 77, mounted upon the rear end 48 of the wagon-body. The upper end of one of these pieces 28 is provided with two parallel ears 78, in the end of which is formed an eye 79 for receiving a clamping-bolt 80. The corresponding end of the other member 28 is perforated, so as to receive the bolt 80, which is passed through its perforation and the holes in the ears to clamp the upper ends of the two pieces together. These two truss-pieces 28 have their upper ends brought together, as shown in Fig. 12, while they diverge toward their lower ends, so as to form an A-shaped truss, through the fork of which extends the trunk 20 of the tree. The tree is tied to this truss-like support by means of a suitable cable or cord 81, as shown in Fig. 12. This gives a firm vertical as well as lateral support to the upper end of the tree, which of course is a great advantage in transporting the tree a long distance. These pieces 28, which thus form the supporting-truss for the trunk of the tree in transporting the tree upon the wagon, are the same pieces described in connection with Figs. 3 and 6.

Figure 11:
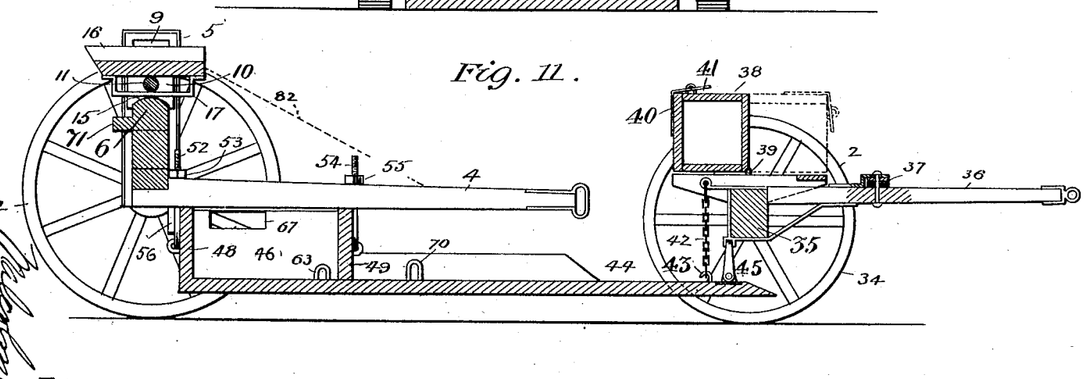
Fig. 11 shows a vertical longitudinal section of the two trucks and wagon-body assembled for transportation without carrying a tree.

It will be noted that the saddle 16 is free to tilt on the friction-roller 11, so that it always fits against the tree snugly, no matter what position the tree may assume relatively to the horizontal. In order, however, to prevent the saddle from shifting forwardly after it has been adjusted to balance the load, I provide a chain 82, which is connected between the outer end of the saddle and a suitable point on the tongue 4 of the tree-supporting truck. This chain, which is shown in Figs. 11 and 13, is adapted to be shortened or lengthened, as the case may be. In practice I line the concave surface of the saddle 16 with soft material in order to prevent barking the tree or in any way injuring it. The lower section 24 of the pulling-chain is provided at a suitable point 83 therein with a hook, so that the chain may be lengthened or shortened, as shown in Fig. 5.

From the foregoing description the use and operation of my improved apparatus will be readily understood. In pulling or extracting a tree from the ground a circular trench 27 is dug in the ground around the tree, and its depth depends upon the size of the tree; but it should be of sufficient depth to provide a ball of considerable depth. The diameter of the trench also depends upon the size of the tree, the diameter varying from five feet to thirteen. After this preparation is made the tree-supporting truck is brought up against the tree with its tongue in upright position, as shown in Fig. 5, and the trunk of the tree is tied to the pole of the truck by suitable connections 21 after the saddle 16 has been forced firmly against the tree, the saddle then being at its inward limit of movement. The head of the pole of the truck is then connected with the large roots of the tree, upon opposite sides thereof, by suitable chains 22 and 24, so as to obtain a direct pull between these points. The pole of the truck is then drawn downwardly by suitable tackle 26, so that the tree is pried out of the ground, as shown in Fig. 15. As already stated, the tree may be transported a short distance upon this truck alone. When, however, the tree is to be transported upon the wagon, the tree-carrying truck is attached to the tree, as described in reference to Fig. 15 and as also shown in Fig. 14. The body of the wagon is brought up near the tree, with its forward end nearest thereto, and laid upon the ground, as shown in Fig. 14. The tree is then extracted, and by pulling upon the tackle 26 it is dragged in inclined position, as shown in Fig. 15, over the flat end of the wagon-body and along the same until it reaches about the center of the body, as shown in Fig. 16. In thus moving the tree onto the body of the wagon the ball of earth is dragged over the ground and then on the body of the wagon, though of course the pole of the truck may be lowered into horizontal position, so as to raise the ball clear of the ground in such movement. The chains 60 of the windlass are then connected with the hooks 63 on the wagon-body and are wound up until the rear end of the wagon-body is brought up against the tree-supporting truck and coupled thereto, as shown in Fig. 17. As the ball of earth 32 rests upon the body of the wagon while it is being elevated, this serves to tip the tree and truck over into horizontal position for the coupling together of the parts. After the tree-supporting truck is coupled to the wagon-body the saddle may be shifted either fore or aft of the wagon to balance the heavy weight of the ball of earth, which in some cases weighs several tons. I generally move the saddle to its inward limit of movement, as shown in Fig. 7 and also in the small views in Figs. 17 to 19, in order to place the main weight—namely, the ball of earth—well forward of the axle of the rear truck. At this time also the saddle may be adjusted vertically, if desired. The forward truck is then brought up to the forward end of the wagon-body, which is raised thereby and connected with the truck in the manner hereinbefore described, so that the apparatus is now assembled, as shown in Fig. 19 and also in Fig. 7, for transporting the tree wherever desired.

As the diameter of the ball of earth of the tree varies according to the size of the tree, the saddle 16 is generally adjusted vertically before the forward truck is attached to the tree for prying it out of the ground. The necessary adjustment can be readily ascertained by measuring the diameter of the ball after the trench is dug around the tree.

After transporting the tree in the manner described to the place where it is to be replanted the trucks in turn are detached from the wagon-body, which is lowered upon the ground, and the forward truck is moved away, so that the tree-supporting truck, with the tree thereon, may be wheeled to the spot where the tree is to be replanted, and the tree is set in place by tipping the truck upwardly, so as to stand the tree in vertical position.

In cases where the wagon is to be taken from one point to another without the tree mounted thereon I prefer to couple up the tree-supporting truck in the manner shown in Fig. 11, wherein the truck is reversed, so that its pole 4 projects forwardly over the wagon-body instead of rearwardly. In coupling this truck up to the wagon-body in its reversed position the pole extends through the notches 50 and 51 of the wagon-body, and the clamping-bolts 52 and 54 are adjusted in the manner already described in connection with the coupling up of the parts when the tree is to be carried upon the wagon.

One of the important advantages of my improved apparatus is that the tree when it is once attached to the truck by which it is extracted from the ground can be readily loaded upon the wagon without the necessity of dismounting the tree from the truck, since any necessary longitudinal adjustment of the tree upon the wagon may be obtained by shifting the sliding saddle, and likewise any vertical adjustment of the saddle may be effected without removing the tree from the saddle.

In this connection it will be noted that a few inches horizontal adjustment of the saddle when the tree is seated therein will effect a great difference in the leverage exerted by the weight of the ball of the tree on the truck, so I am enabled to readily shift the load to balance it, and thereby render the handling of the loaded tree much easier than would be the case if the saddle did not have capacity of longitudinal adjustment. In fact, this advantage, arising from the longitudinally-adjustable saddle, becomes of the utmost importance in handling large trees. This greatly reduces the time and labor necessary in transporting and replanting a tree.

It will be observed that the hooks 57, which are carried by the tree-supporting truck and which hook into the eyes 58 on the wagon-body, serve to brace the wagon-body laterally and prevent its rocking on the pole 4 of the truck in addition to acting as draft-hooks, as hereinbefore described.

I wish to be understood as not limiting my invention to the specific form of construction of the various parts thereof as herein set forth, as various changes may be made therein without, however, departing from the spirit of the invention.

Having thus described my invention, what I claim, and desire to secure by Letters Patent, is—

1. In an apparatus for removing trees, the combination of a tilting two-wheeled truck provided with a pole, a saddle mounted upon said truck and adapted to receive the trunk of the tree, the said saddle being adjustable in a line at right angles to the axle of the truck, and means for adjusting the saddle in such direction while the trunk of the tree is seated therein to vary the distance at which the tree is supported on the truck, substantially as and for the purpose set forth.

2. In an apparatus for removing trees, the combination of a tree-carrying vehicle provided with a saddle adapted to receive the trunk of the tree and support it in position upon the vehicle, said saddle being adjustable in a line at right angles to the axle of said vehicle, and means for adjusting the saddle in such direction while supporting the tree to vary the distance at which the tree is supported upon the vehicle, substantially as and for the purpose set forth.

3. In an apparatus for removing trees, the combination of a tree-carrying vehicle provided with a saddle adapted to receive the trunk of the tree and support it in position upon the vehicle, said saddle being adjustable in a line at right angles to the axle of said vehicle and adapted to tilt on a horizontal axis, and means for adjusting the saddle in such direction while supporting the tree to vary the distance at which the tree is supported upon the vehicle, substantially as and for the purpose set forth.

4. In an apparatus for removing trees, the combination of a tree-carrying vehicle and a horizontally-adjustable saddle adapted to receive the trunk of the tree and support it in position for transportation, a supporting-roller provided with suitable bearings and upon which said saddle is directly supported and adapted to tilt, substantially as and for the purpose set forth.

5. In an apparatus for removing trees, the combination of a tree-carrying vehicle and a horizontally-adjustable saddle adapted to receive the trunk of the tree and support it in position for transportation, a supporting-roller provided with vertically-adjustable bearings, the said saddle being mounted upon and adapted to tilt on said roller, and means for vertically adjusting said supporting-roller, substantially as and for the purpose set forth.

6. In an apparatus for removing trees, the combination of a tree-carrying vehicle and a horizontally-adjustable saddle adapted to receive the trunk of the tree and support it in position for transportation, a supporting-roller provided with suitable bearings and upon which said saddle is supported and adapted to tilt, and guides depending from said saddle and embracing the said supporting-roller, substantially as and for the purpose set forth.

7. In an apparatus for removing trees, the combination of a tilting two-wheeled tree-supporting truck provided with a pole to which the trunk of the tree may be attached, a movable saddle mounted upon said truck for receiving the trunk of the tree and adapted to be adjusted fore and aft of the truck so as to shift the tree lengthwise thereof, and means for adjusting said saddle, substantially as and for the purpose set forth.

8. In an apparatus for removing trees, the combination of a tree-carrying vehicle provided with a movable saddle adapted to receive and support the trunk of the tree, and means for adjusting the saddle toward and away from the vehicle to lower or raise the saddle, said means comprising an adjustable support for the saddle and a set of lifting-jacks upon which said support is mounted, substantially as and for the purpose set forth.

9. In an apparatus for removing trees, the combination of a tree-carrying vehicle provided with a longitudinally-adjustable saddle adapted to receive and support the trunk of the tree, a supporting-roller for supporting said saddle and adjusting it longitudinally, said supporting-roller being adjustable toward and away from the vehicle to lower or raise the saddle, and a set of lifting-jacks upon which said roller is mounted, substantially as and for the purpose set forth.

10. In an apparatus for removing trees, the combination of a tree-carrying truck provided with a suitable saddle for receiving the trunk of the tree, a wagon-body connected by one end with the said tree-carrying truck, wheels for supporting the other end of said wagon-body, two truss members adapted to be connected together at their upper ends and having their lower ends each provided with a hook, an eye mounted upon each side of the wagon-body for detachably engaging the hooks upon the lower ends of said truss members, respectively, and detachable connections for securing the trunk of the tree to the truss members between the same, substantially as and for the purpose set forth.

11. In an apparatus for removing trees, the combination of a tree-carrying truck provided with a pole and having a suitable saddle for receiving the trunk of the tree, a wagon-body detachably connected by one end with said truck-pole, wheels for supporting the other end of said wagon-body, two truss members adapted to be removably mounted either upon the said wagon-body or the pole of said truck, said truss members being adapted to have their upper ends connected together above the trunk of the tree, and detachable means for securing the trunk of the tree to said truss members between the same, substantially as and for the purpose set forth.

In testimony whereof I have hereunto set my hand in the presence of the two subscribing witnesses.

MALCOLM RYDER.

Witnesses:
A. R. COONS,
WILLIS FOWLER.